May 26, 1936.  A. A. CAMBIASSO  2,042,386

AUTOMATIC BUTTERING MACHINE FOR BREAD

Filed May 19, 1934  2 Sheets-Sheet 1

Inventor:
A. A. Cambiasso
Glascock Downing & Seebold
Attorney

May 26, 1936.  A. A. CAMBIASSO  2,042,386
AUTOMATIC BUTTERING MACHINE FOR BREAD
Filed May 19, 1934  2 Sheets-Sheet 2

Inventor:
A. A. Cambiasso
By:
Glascock Downing & Seebold
Attorney

Patented May 26, 1936

2,042,386

UNITED STATES PATENT OFFICE 2,042,386

AUTOMATIC BUTTERING MACHINE FOR BREAD

Anibal Agustin Cambiasso, Buenos Aires, Argentina

Application May 19, 1934, Serial No. 726,566
In Argentina June 21, 1933

7 Claims. (Cl. 91—14)

The present invention relates to a machine for automatically buttering bread and has for its object the provision of a machine of a class described suitable for application to the usual types of circular cutter machines or slicers as used for cold meats and the like.

A slicer with the new machine applied to it may then be used to cut and butter slices of bread in one operation, thus saving time, reducing butter wastage and rendering the whole process more hygienic than is at present the case when slices of bread cut by the slicer are separately buttered by hand.

The new machine is especially useful in restaurants, refreshment rooms and the like and enables sandwiches, bread and butter and the like to be prepared at very much lower cost.

The new machine is of simple and economic construction and is adapted to be driven by the same drive as the slicer, to which it can be connected by suitable synchronizing means. It represents but a small load on the slicer drive and thus will not materially affect the operation of the latter.

The machine comprises essentially a stationary member forming an upper chamber coaxial with and superimposed upon a lower chamber, and a movable member consisting of a shaft extending centrally and coaxially through both said chambers and having associated with the portion thereof lying within the upper chamber a disc adapted to be intermittently moved longitudinally of said chamber upon rotation of said shaft. The portion of the shaft lying within the lower chamber carries rigidly secured to it a roller of smaller diameter than said lower chamber which latter has an opening provided in its wall at a point such that when said machine is positioned operatively on a slicer the opening lies in the path of the article to be sliced when said article is in position for a cut to be taken. The shaft is adapted to be driven through suitable gearing from the main slicer drive and means are provided to transmit the rotary motion of the shaft to said disc and transform it to intermittent translational motion of the latter.

For a better understanding of the present invention and of the manner in which it is to be performed, a preferred embodiment thereof will now be described and reference will be made to the accompanying drawings in which.

Figure 1:
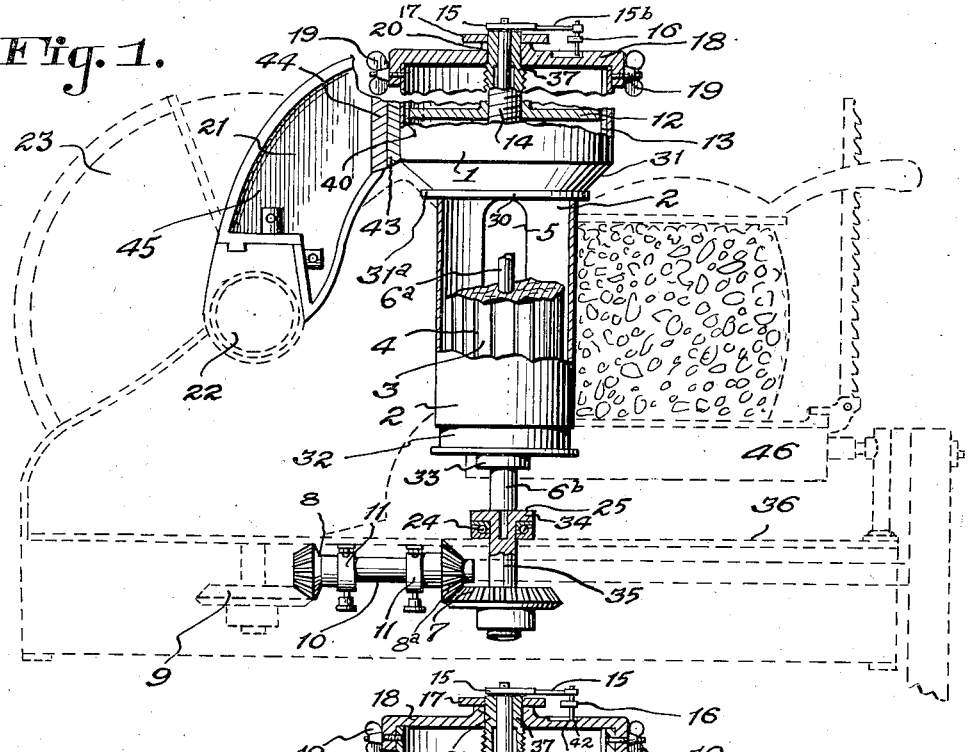
Fig. 1 is a part-sectional elevation of the machine as applied to a circular slicer.
Figure 2:
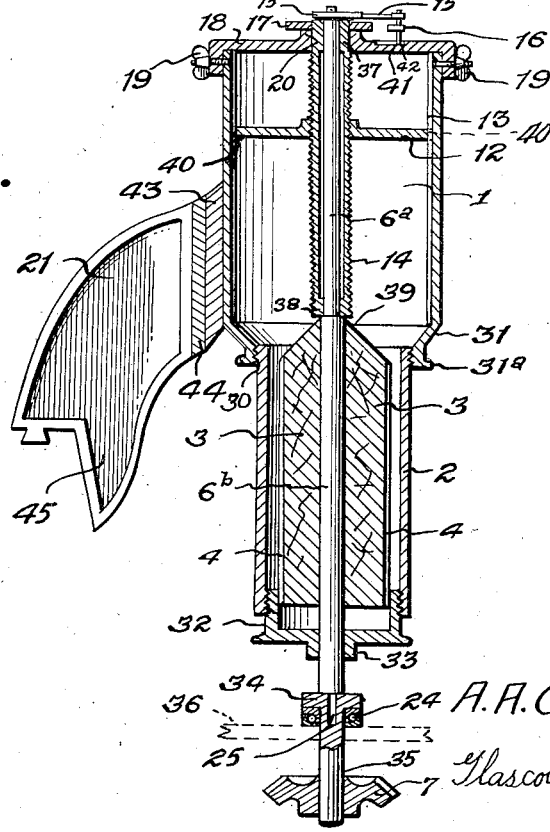
Fig. 2 is a longitudinal section of the machine.

The machine comprises a storage chamber 1 having a cylindrical bore and an operative chamber 2 having a cylindrical bore of smaller diameter than the former chamber and securely coupled thereto as by the screwed joint 30 so as to extend coaxially therewith. To permit of such coupling one end 31 of the storage chamber 1 is reduced as shown to form the conico-tubular coupling member 31a. The operative chamber 2 has a portion of its cylindrical wall cut away to form the discharge opening 5, and is provided at its end remote from the storage chamber 1, with a suitable closure-member as for example the screwed-in cap 32. The end of storage chamber 1 remote from cylinder 2 is likewise provided with a cover 18 adapted to be secured thereto by means of the bolts and wing-nuts indicated at 19. Both cap 32 and cover 18 carry centrally disposed bosses, 33 and 20 respectively. Boss 33 is drilled out to form a bearing for a main shaft 6 extending axially through both the chambers 1 and 2. The end of the shaft 6 which projects from the cap 32 has its extremity reduced to form a tongue 25 adapted to engage in a slot provided on the enlarged end 34 of a shaft 35 which carries on its other end a bevel gear 7. The enlarged end 34 of shaft 35 is adapted to rest on its side remote from main shaft 6, on a suitable thrust bearing 24 supported by a portion of the slicer base-plate 36 through which shaft 35 also passes.

Bevel gear 7 is positively driven through a suitable transmission device which, in the example illustrated comprises a shaft 10 journalled in bearings 11 supported on base plate 36 and carrying at its end nearest to bevel gear 7 a bevel pinion 8a and at its other end a second bevel pinion 8 meshing with a bevel wheel 9 forming part of the standard slicer drive.

The portion 6a of main shaft 6 extending through storage chamber 1 is of diameter smaller than the portion 6b extending through chamber 2 and is surrounded by a sleeve 14. One end 37 of said sleeve is journalled in and extends slightly beyond the boss 20 of cover 18, while the other end 38 thereof abuts against a shoulder 39 formed by the increase in diameter of portion 6b of shaft 6. Intermediate these two ends and for the greater portion of its length, sleeve 14 is externally threaded and internally preferably of slightly larger effective diameter than at said two ends, at which points at least, it is made a bearing fit on the reduced portion 6a of shaft 6, either by the reduction of the internal diameter of the sleeve or by the provision of a suitable liner (which should however be affixed to the sleeve or to the shaft but not to both) or in any other convenient and known manner.

The threaded portion of sleeve 14 carries a circular plate or disc 12 of diameter substantially equal to the internal diameter of storage chamber 1, and having two or more slots 40 in its periphery adapted to co-operate with a like number of longitudinally extending guides 13 formed on the interior of said chamber 1, so that upon rotation of the sleeve 14, plate 12 will be propelled axially along the cylinder 1 without rotation.

Figure 3:
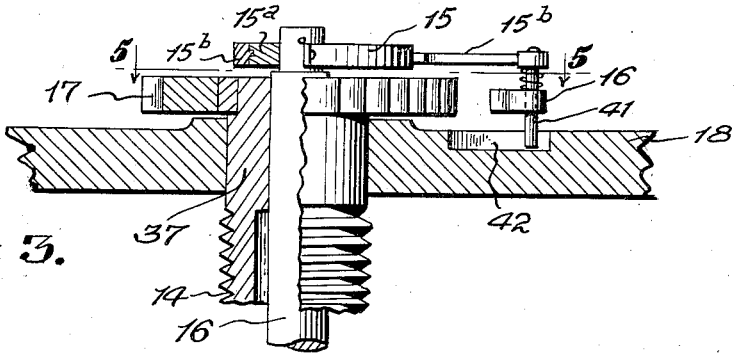
Fig. 3 is a part-sectional elevation of a portion of the mechanism.
Figure 4:
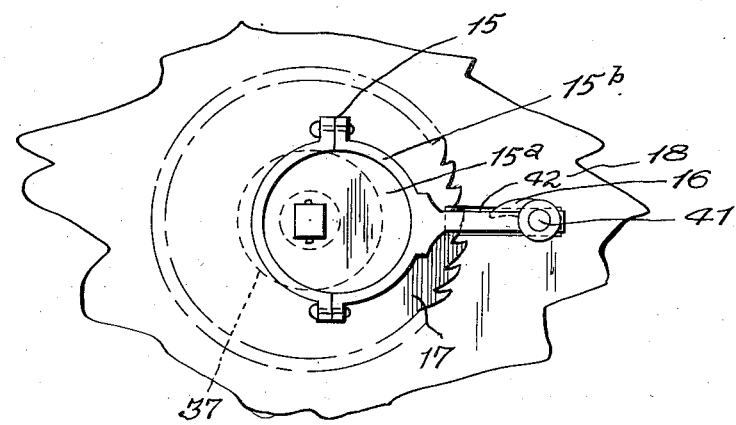
Fig. 4 is a plan view looking down on Fig. 3.
Figure 5:
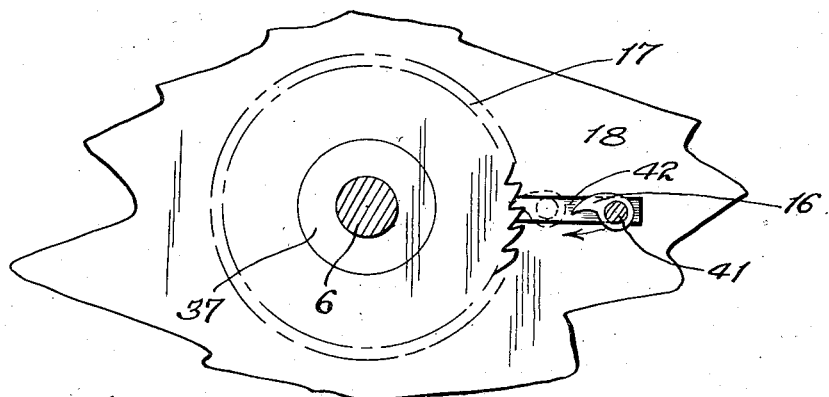
Fig. 5 is a horizontal section along the line 5—5 of Fig. 3.

As best seen in Figs. 3 to 5, the end of the reduced portion 6a of shaft 6 is squared and extends beyond the end 37 of sleeve 14 and carries an excentric 15 loosely mounted thereon and secured by means of a split pin or the like if necessary. Said excentric has a portion 15a excentric to shaft 6a and concentrically mounted in a strap portion 15b which, on the side facing the cover 18 carries on a depending pin 41 a pawl 16 adapted intermittently to engage with the teeth of a ratchet wheel 17 carried by end 37 of sleeve 14. The free end of said pin 41 is adapted to reciprocate in a recess 42 so that as the excentrically mounted portion 15a of excentric 15 is rotated by shaft 6a, the pawl will be brought into and out of engagement with said ratchet wheel 17 as indicated in dotted position in Fig. 5, the exact movement and shape of the pawl and ratchet teeth being such that upon each engagement of pawl 16 with wheel 17 the latter and consequently sleeve 14, is caused to move through a part of a turn, thus moving plate 12 a short distance axially of cylinder 1.

On the thicker portion 6b of shaft 6 is mounted a roller 3 of smaller diameter than the internal diameter of cylinder 2 and extending through it longitudinally for substantially the whole of its length thus forming an annular space between the wall of chamber 2 and the surface of the roller. The roller 3 which may be of wood, metal or any other suitable material preferably has its outer surface roughened or interrupted as by the provision of grooves 4, and has that end which is directed towards chamber 1 gradually reduced to form a cone.

The storage chamber 1 has its outer surface thickened at a suitable portion to form a flat surface 43 which may be affixed to the flat end 44 of supporting member 21. The thickened portion is preferably of dovetail section to cooperate with a similarly shaped groove in end 44, so as to permit of easy withdrawal of the former. The other end 45 of member 21 is shaped to conform with the contour of the central portion 22 of the cutter holder 23 of the slicer and is adapted to make a dovetail joint therewith as shown. The general shape of member 21 is such that the buttering machine will be supported with the longitudinal opening 5 at right angles to the direction of motion of the moving table 46 of the slicer and at such distance therefrom that as the bread is carried towards the cutter 23a the outer face of the slice about to be cut lightly contacts through slots with the exposed portion of the layer of butter with which the roller 3 is covered as hereinafter explained.

The machine operates as follows. The cover 18 of the storage chamber 1 is removed by undoing nuts 19 and withdrawing the cover which will carry with it the sleeve 14, and plate 12 as well as the external driving mechanism 15, 16, 17. If a split-pin is used normally to prevent the excentric 15 from being withdrawn from the shaft, such split-pin or similar locking device should of course first be removed.

Chamber 1 is now filled with butter which has previously been warmed to a suitable soft condition and, after plate 12 has been spun back to its starting position that is to say as close as possible to the inner face of cover 18, the sleeve is slipped over the end of shaft 6 and the cover replaced care being taken to see that the slots 40 in plate 12 engage properly with guides 13. Upon replacement of the nuts 19 (and if necessary of the split-pin or the like) the machine is ready for use. Assuming that it has been mounted on a slicer as indicated, if the latter is now operated, as for example to cut bread, bevel wheel 9 will rotate and will through the gearing and tongue hereinbefore referred to, drive shaft 6. Roller 3 will thereupon rotate as will excentric 15 which will as already described intermittently drive ratchet wheel 17 to cause plate 12 to advance along cylinder 1 thus forcing the thereincontained butter out of the reduced end 30 and into cylinder 2. Plate 12 will of course continue to advance intermittently as long as the machine operates. The conical end of roller 3 will cause the butter to divide and pass into the annular space between the roller and the wall of cylinder 2, thus providing a layer of butter which is gripped by the roughened surface of the roller 3 and thereby carried round past opening 5.

As the slicer operates, the loaf from which the slices are to be cut will be reciprocated across opening 5 but only during its working stroke will it have been brought by the normal operation of the slicer mechanism, sufficiently close to said opening for it to make contact with the layer of butter exposed therethrough. As said layer is not stationary but is continually being rotated by means of roller 3, it will be clear that a smearing or spreading movement has been obtained which practical experiments have shown to be highly efficient and satisfactory.

When it is desired to use the slicer for cold meats or the like not requiring to be buttered, the buttering machine may easily be removed by lifting it vertically out of engagement with the member 21 and moving it clear of the slicer.

It will be clear to those skilled in the art that the embodiment hereinabove described may be modified in a variety of ways without thereby departing from the nature and scope of the invention. The gear ratio between bevel wheel 9 and bevel gear 7 may be arranged so that the linear speed of the butter layer past opening 5 is equal to or greater or less than that of the bread.

Having now particularly described and ascertained the nature of my said invention and in what manner the same is to be performed, what I claim is:

1. A machine for automatically buttering slices of bread cut by a rotary mechanical slicer of conventional type having a main drive, said machine comprising a cylindrically bored upper chamber adapted to contain a supply of butter, a lower cylindrically bored chamber secured coaxially to and of smaller internal diameter than said upper chamber, a discharge orifice in the cylindrical wall of said lower chamber, a roller coaxially and rotatably mounted within and of smaller diameter than the lower chamber, thus forming an annular space surrounding said roller, propelling means extending into said upper chamber for forcing the butter downwards into said annular space, driving means for positively rotating said roller, actuating means for driving said propelling means, and coupling means for coupling the said actuating and driving means to the main drive of the slicer.

2. A machine for automatically buttering slices of bread cut by a rotary mechanical slicer of any known type having a main drive, said machine comprising a cylindrically bored upper chamber adapted to contain a supply of butter, a cylindrically bored lower chamber of smaller internal diameter than and secured coaxially to said upper chamber, a discharge orifice in the cylindrical wall of the lower chamber, a roller coaxially and rotatably mounted within and of smaller diameter than said lower chamber, propelling means extending into said upper chamber for forcing the butter from the upper into the lower chamber, and actuating means for driving said propelling means wherein the end of said lower chamber remote from the upper chamber is provided with a detachable cover having a centrally disposed bearing and said roller is carried by a shaft one end of which is journalled in and projects beyond said bearing and carries propulsion means cooperating with transmission means coupled to the main drive of the slicer the other end of the shaft extending through and beyond said upper chamber and carrying means co-operating with said actuating means for transmitting the drive to said propelling means.

3. A machine for automatically buttering slices of bread cut by a rotary mechanical slicer of any known type, comprising an upper chamber adapted to contain a supply of butter, a lower chamber of smaller internal diameter extending co-axially from said upper chamber, and having a discharge orifice in its wall, an end-plate for the end of said lower chamber remote from the upper chamber, a centrally disposed bearing in said end plate, a shaft extending through both said chambers and having one end journalled in and projecting beyond said bearing, a roller of smaller diameter than said lower chamber, mounted on said shaft and lying within said lower chamber, propelling means extending into said upper chamber for forcing the butter down into said lower chamber and actuating means for said propelling means, wherein the end of the upper chamber remote from said lower chamber is provided with a cover having a centrally disposed bearing member and the end of said shaft remote from the lower chamber passes through and extends beyond the bearing member in said cover and said actuating means comprises an excentric mounted on said shaft on the side of said cover remote from the upper chamber, a pin carried by said excentric, a pawl mounted on said pin, a ratchet wheel operatively associated with said propelling means and adapted to be intermittently moved by said pawl in response to rotation of said excentric and a radial guide slot for said pin in said cover.

4. A machine for automatically buttering slices of bread cut by a rotary mechanical slicer of any known type said machine comprising a cylindrically bored upper chamber adapted to contain a supply of butter, a lower cylindrically bored chamber of smaller internal diameter than and detachably and coaxially secured to said upper chamber, a discharge orifice in the cylindrical wall of the lower chamber, a roller coaxially and rotatably mounted within and of smaller diameter than the lower chamber, propelling means for forcing the butter from the upper into the lower chamber, and actuating means for said propelling means comprising a shaft extending through both said chambers, an excentric mounted on one end thereof, a pin carried by said excentric, a pawl mounted on said pin, and a ratchet wheel operatively associated with said propelling means, wherein said propelling means includes a sleeve surrounding said shaft and extending in one direction beyond the end of said upper chamber remote from said lower chamber and in the other direction to within a short distance of the end of the upper chamber which is secured to the lower chamber, said sleeve having the major portion of its length intermediate its two ends screwthreaded, a disc of diameter substantially equal to the internal diameter of the upper chamber concentrically mounted on the threaded portion of said sleeve, slots in the edge of said disc, longitudinal straight guide members provided on the inner surface of said upper chamber and adapted to co-operate with said slots for compelling said disc to move longitudinally of said upper chamber upon rotation of said sleeve, said ratchet wheel being mounted on the end of said sleeve which extends beyond said upper chamber.

5. A machine for automatically buttering slices of bread cut by a rotary mechanical slicer of any known type, said machine comprising a cylindrically bored upper chamber adapted to contain butter, a cylindrically bored lower chamber coaxially and detachably secured to said upper chamber, a discharge orifice in the cylindrical wall of the lower chamber, a roller coaxially and rotatably mounted within and of smaller diameter than the lower chamber, an end-plate for the end of said lower chamber, remote from said upper chamber, a centrally disposed bearing in said end-plate, a shaft having one end journalled in and projecting beyond said bearing, and extending through both said chambers, an externally threaded sleeve surrounding the portion of said shaft lying within said upper chamber, a disc of diameter substantially equal to the internal diameter of the upper chamber concentrically mounted on the threaded portion of the sleeve, and actuating means for said sleeve wherein the end of said upper chamber remote from said lower chamber is provided with a detachable cover having a centrally disposed bearing member and said shaft has in the neighborhood of the line of junction between the two chambers an abutment, upon which one end of said sleeve rests, the other end thereof being journalled in and extending beyond said bearing member, said sleeve being a bearing fit on said shaft at least at its two ends.

6. A machine for automatically buttering slices of bread cut by a rotary mechanical slicer of any known type having a base plate and a main drive, said machine comprising an upper chamber adapted to contain a supply of butter, a lower chamber detachably and coaxially joined at one end to said upper chamber, a discharge orifice in the cylindrical wall of the lower chamber, a roller coaxially and rotatably mounted within and of smaller diameter than the lower chamber, a cover for the end of said upper chamber remote from said lower chamber, a centrally disposed bearing member in said cover, an end-plate for the end of the lower chamber, remote from the upper chamber, a centrally disposed bearing in said end-plate, driving means for said roller consisting of a shaft having a lower end journalled in and projecting beyond said bearing and an upper end passing through and beyond said bearing member, propelling means extending into said upper chamber for forcing the butter therein contained into said lower chamber, actuating means for said propelling means carried by the upper end of said shaft and coupling means for coupling said driving means to the main drive of the slicer wherein the said shaft has its upper end squared and its lower end cut to form a tongue and said coupling means comprises an auxiliary shaft mounted on the base plate of the slicer and having a recess cut in one of its ends and suitably connected at its other end to said main drive, said tongue being adapted slidably to fit in said recess.

7. A machine for automatically buttering slices of bread cut by a rotary mechanical slicer of any known type having a central cutter holder, said machine comprising an upper chamber adapted to contain a supply of butter, a lower chamber secured coaxially to one end of said upper chamber and adapted to receive butter therefrom, a discharge orifice in said lower chamber, a raised flat surface provided externally on one of said chambers, propelling means in said upper chamber for forcing the therein contained butter into the lower chamber, roller means in said lower chamber for positively moving the butter past said orifice wherein a supporting arm is provided for supporting said machine and rigidly connecting it to the slicer, said supporting arm having one extremity shaped to correspond with the contour of the central portion of said cutter holder, and being adapted to be detachably affixed thereto, the other extremity of the arm being shaped detachably to receive said raised flat surface.

ANIBAL AGUSTIN CAMBIASSO.